3,235,448
NOVEL PESTICIDAL COMPOSITION
Yasuyoshi Oshima and Morifusa Eto, Fukuoka-shi, and Takeshi Kato, Fukuoka-ken, Japan, assignors to Sumitomo Chemical Company, Ltd., Osaka, Japan, a corporation of Japan
No Drawing. Filed July 3, 1964, Ser. No. 380,131
4 Claims. (Cl. 167—30)

The present invention relates to novel pesticidal compositions. More particularly, it relates to novel pesticidal compositions comprising as the essential active ingredient at least a cyclic phosphoramidate compound having the general Formula I,

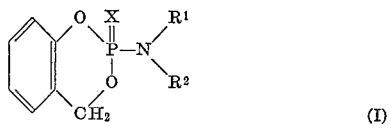

(I)

wherein $R^1$ represents a member selected from the group consisting of hydrogen atom, alkyl and aryl radicals, $R^2$ represents a member selected from the group consisting of hydrogen atom and alkyl radicals and X represents a member selected from the group consisting of oxygen and sulphur atoms.

The inventors have made extensive researches on the development of novel agricultural chemicals, and have succeeded to provide the cyclic phosphoramidates of the general Formula I as the active ingredient for pesticidal composition which possess significant insecticidal power, systemic effect, nematocidal and acaridical effects, and other pesticidal abilities.

One object of the present invention is to provide a novel pesticidal composition containing as the essential active ingredient the cyclic phosphoramidates having the significant pesticidal power to various kinds of injurious insects, nematoda and acarids which would be apparent from the tests set forth below. Other objects of the present invention will be apparent from the following description.

As set forth above, a feature of the present compounds is in that the present compounds have significant pesticidal power. Besides the pesticidal power, the systemic effect is another feature of the present compounds. Accordingly, when applied to at least a portion of plant, e.g. root, the present compound is absorbed into the system and translocated to all growing parts of the plant; it will spread throughout the tissues of leaves to be protected. Thus it kills all injurious insects on the leaves.

The present cyclic phosphoramidates possess stronger nematocidal effect than D-D which is a well-known halogenated hydrocarbon nematocide, and are effective for the control of white tip of rice plants by treatment of rice seeds. This is another feature of the present compounds.

The phosphoramidates having the general Formula I

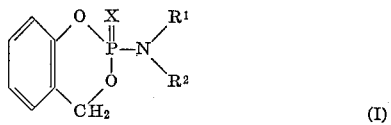

(I)

wherein $R^1$ represents a member selected from the group consisting of hydrogen atom, alkyl and aryl radicals, $R^2$ represents a member selected from the group consisting of hydrogen atom and alkyl radicals and X represents a member selected from the group consisting of oxygen and sulphur atoms, are produced by reacting o-hydroxybenzyl alcohol with a phosphoric acid derivative having the general Formula II,

(II)

wherein $R^1$, $R^2$ and X have the same meanings as identified above.

As to the $R^1$ in the general Formula I, hydrogen atom, lower alkyl and phenyl radicals are preferred, and as to the $R^2$ in the same formula, hydrogen atom and lower alkyl radicals are preferred.

In producing the active ingredient in the composition of the present invention, 1 mole portion of o-hydroxybenzyl alcohol, preferably in a dry solvent such as chloroform and toluene, is contacted with 1 mole or slightly excess of a phosphoric acid derivative having the general Formula II. Ordinarily, the reaction between the both components is favorably effected in the presence of 2 moles of a de-hydrogen chloride agent, for example, a tertiary base such as pyridine and triethylamine. In the preferable procedure, the phosphoric acid derivative having the general Formula II is slowly dropped into a chloroform solution of o-hydroxybenzyl alcohol and a tertiary amine, while being stirred and cooled with ice. The reaction completes within 3.5 or 4 hours at a temperature of from about 3° C. to room temperature. In some cases, the reaction condition mentioned above is insufficient to proceed the condensation reaction depending upon the kinds of reactants.

In such cases, the reaction may be conducted by heating the reaction mixture up to a temperature of about 60–80° C., e.g., for 13 or 16 hours in the toluene solution, in the presence of 2 moles or slight excess of anhydrous potassium carbonate, instead of the tertiary base, and a small amount of copper powder, while being vigorously stirred.

This reaction is preferably conducted under a moisture-proof condition.

In the case when the phosphoric acid derivative having the general formula II is not a liquid but a solid the compound may be dissolved in an adequate solvent and dropped into the mixture of o-hydroxybenzyl alcohol, a de-hydrogen chloride agent such as pyridine, and a solvent. Alternatively, the de-hydrogen chloride agent such as pyridine may be dropped into the mixture of a phosphoric acid derivative having the general Formula II, o-hydroxybenzyl alcohol and a solvent such as chloroform. In some cases, the reaction between the two components proceeds even in the absence of a de-hydrogen chloride agent such as pyridine. In such cases, the reaction mixture is preferably cooled to a low temperature such as −4° C.

After the reaction is completed, the reaction mixture is washed with an ice-cooled water, with a dilute aqueous alkali solution such as dilute sodium bicarbonate and carbonate solutions, and then with a dilute aqueous acid solution such as dilute hydrochloric and acetic acid solutions. The order of the washings with alkali and acid may be reversed. Then, in general, the reaction mixture is dried, for example, over anhydrous sodium sulphate and the solvent is removed in vacuo. The remaining reaction product is purified by recrystallization or vacuum distillation.

In order to put the phosphoramidates according to the present invention into practical use, various inert carriers may be combined therewith to make a pesticidal composition containing a toxic quantity of at least one of the said compounds. The compositions include such formulations as emulsion, suspension, dust, oil and granule preparations.

An emulsion preparation according to the invention may be prepared, for example, by mixing the compound with at least one of organic solvents such as benzene and xylene and an emulsifier, such as nonionic or a blend of nonionic and anionic surface active agents, in a proper proportion to make an emulsifiable concentrate and by diluting the thus obtained concentrate with water at the time of use. The thus obtained emulsion is sprayed directly to the pests or to the objects to be protected.

To provide a wettable power, the compound of the present invention is mixed with a wetting agent such as nonionic and a blend of nonionic and anionic surface active agents and is further combined with a powdered carrier such as talc, kaolin, diatomaceous earth and synthetic silicate. A suitable suspension for practical use may easily be prepared from the said wettable powders merely by putting them into water.

By mixing the present compound with a powdered carrier which is equal to the material used in the production of the wettable powder, a dust formulation may be obtained. It may be prepared by admixing the ingredients directly, but preferably the present compound may be dissolved into a solvent having a low boiling point, the solution admixed with the carrier, and the solvent evaporated off, to obtain a dust.

Further, the compound of the present invention may be dissolved in a solvent such as deodorized kerosene to make an oil preparation. The solubility in kerosene of the present compound is not so high and an auxiliary solvent such as benzene, xylene and methylnaphthalene may be used.

Still further, a granule preparation of the present invention may be prepared, for example, by mixing the compound with a surface active agent and a powdered carrier, kneading the resulting mixture together with polyvinyl alcohol or fatty acid of tall oil and water, molding and drying the resulting product.

As for the manufacturing method of the pesticide of the present invention, it would be apparently known to those skilled in the art that any recipe other than those described above may be utilized according to the common procedures for preparing organophosphorus insecticides.

The following examples are presented in order to illustrate the preferred embodiment of the invention, but they should never be construed to limit the invention. In the examples all parts are meant by weight.

*Example 1.—Production of 2 methylamino-4H-1,3,2-benzodioxaphosphoran-2-one ($R^1$=$CH_3$, $R^2$=H and X=O, in the Formula I)*

A mixture of 9.2 g. of o-hydroxybenzyl alcohol, 15 g. of triethylamine and 90 ml. of chloroform was cooled with ice and stirred. Eleven grams of N-methylphosphoramidic dichloride was slowly dropped thereto, while keeping the reaction temperature at 10–14° C. After the dropping was finished, the reaction mixture was allowed to stand overnight at room temperature, and then washed sequentially with ice water, a dilute hydrochloric acid, and aqueous dilute sodium bicarbonate solution and water, then dried over anhydrous sodium sulfate. Upon removal of the solvent in vacuo, 8.05 g. of crude crystals, M.P. 86° C., were obtained as residue. The crude crystals were recrystallized from hot benzene to yield pure crystals, M.P. 87° C., of 2-methylamino-4H-1,3,2-benzodioxaphosphoran-2-one.

*Example 2.—Production of 2-ethylamino-4H-1,3,2-benzodioxaphosphroan-2-one ($R^1$=$C_2H_5$, $R^2$=H and X=O, in the Formula I)*

A mixture of 13.7 g. of o-hydroxybenzyl alcohol, 19 g. of pyridine and 56 ml. of chloroform was cooled with ice and stirred. Twenty one grams of N-ethylphosphoramidic dichloride was gradually dropped thereto during 40 minutes, while keeping the reaction temperature at 4–5° C. The reaction mixture was stirred for 2 hours at 3–5° C., and allowed to stand overnight at room temperature, and then washed sequentially with ice water, an aqueous dilute sodium bicarbonate solution, an aqueous dilute acetic acid and water.

The water in the chloroform layer was removed with dry filter paper and the chloroform was evaporated in vacuo. The residue was allowed to stand in an ice box, and 23 g. of crude crystals, M.P. 65° C., was obtained. Upon recrystallization from benzene yielded pure crystals, M.P. 67–68° C., of 2-ethylamino-4H-1,3,2-benzodioxaphosphoran-2-one.

*Example 3.—Production of 2-n-propylamino-4H-1,2,3-benzodioxaphosphoran-2-one ($R^1$=n-$C_3H_7$, $R^2$=H and X=O, in the Formula I)*

A mixture of 12.3 g. of o-hydroxybenzyl alcohol, 18.7 g. of N-propylphosphoramidic dichloride and 100 ml. of chloroform was cooled to −4° C., and stirred and 16 g. of pyridine was dropped thereto. The mixture was stirred for 4 hours at room temperature, and washed sequentially with ice water, an aqueous dilute sodium carbonate solution, a dilute hydrochloric acid and water, then dried over anhydrous sodium carbonate. Upon removal of the solvent in vacuo, followed by vacuum distillation, 8 g. of liquid, B.P. 135–140° C./0.5 mm. Hg, 2-n-propylamino - 4H - 1,3,2 - benzodioxaphosphoran - 2 - one was obtained.

*Example 4.—Production of 2-diethylamino-4H-1,3,2-benzodioxaphosphoran-2-one ($R^1$=$R^2$=$C_2H_5$ and X=O in the Formula I)*

Twelve and three-tenths gram of o-hydroxybenzyl alcohol was dissolved in 100 ml. of toluene by heating. Thirty grams of finely powdered anhydrous potassium carbonate and 0.5 g. of copper powder were added thereto, and the mixture was slowly added with 19.1 g. of N-diethylphosphoramidic dichloride, while being stirred and kept at 60° C. After 1 hour the temperature of the reaction mixture was raised to 70–80° C., and the mixture was stirred for 12 hours at that temperature, and filtered. The filtrate was washed sequentially with water, an aqueous dilute sodium carbonate solution, dilute hydrochloric acid and water, and dried over anhydrous sodium sulfate.

Upon removal of the solvent in vacuo, followed by vacuum distillation, 6.3 g. of liquid, B.P. 133–136° C./0.5 mm. Hg was obtained. By cooling, the liquid turned to crystals, M.P. 43.5–44° C., of 2-diethylamino-4H-1,3,2-benzodioxaphosphoran-2-one.

*Example 5.—Production of 2-dimethylamino-4H-1,3,2-benzodioxaphosphoran - 2 - thione ($R^1$=$R^2$=$CH_3$ and X=S, in the Formula I)*

Twelve and three-tenths grams of o-hydroxybenzyl alcohol was dissolved in 100 ml. of toluene by heating.

Thirty grams of finely powdered anhydrous potassium carbonate and 0.5 g. of copper powder were added thereto, and the mixture was added dropwise with 18 g. of N,N-dimethylphosphoramidothioic dichloride, while being stirred and kept at 60° C.

After 1 hour, the temperature of the reaction mixture was raised to 70–80° C., and the mixture was stirred for 15 hours at that temperature and filtered. The filtrate was washed sequentially with water, an aqueous dilute sodium carbonate, dilute hydrochloric acid and water and dried over anhydrous sodium sulfate. The solvent was removed in vacuo, and the residue was distilled in vacuo, whereby 6.2 g. of liquid, B.P. 118–122° C./0.2 mm. Hg, dimethylamino-4H-1,3,2 - benzodioxaphosphoran-2-thione was obtained.

The following Table I shows the properties of the cyclic phosphoramidates including those obtained in the preceding examples and the others obtained according to the similar procedures.

TABLE I.—CYCLIC PHOSPHORAMIDATES

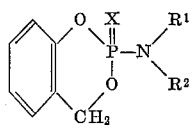

| No. | R¹ | R² | X | B.P.(M.P.) (centigrade) | Procedure [1] | Yield (percent) based upon o-hydroxyl-benzyl alcohol |
|---|---|---|---|---|---|---|
| 1 (Ex. 1) | $CH_3$ | H | O | (87°) | At | 55 |
| 2 (Ex. 2) | $C_2H_5$ | H | O | (68°) | Ap | 70 |
| 3 (Ex. 3) | n-$C_3H_7$ | H | O | 135–140°/0.5 mm. Hg | Ap' | 35 |
| 4 | i-$C_3H_7$ | H | O | (84°) | Ap' | 44 |
| 5 | n-$C_4H_9$ | H | O | (46°–47°) | Ap' | 58 |
| 6 | $C_6H_5$ | H | O | (131–132.5°) | At | 40 |
| 7 | $CH_3$ | $CH_3$ | O | (121°) | At | 21 |
| 8 (Ex. 4) | $C_2H_5$ | $C_2H_5$ | O | 133–136°/0.5 mm. Hg (44°) | B | 25 |
| 9 | $CH_3$ | H | S | 120–123°/0.2 mm. Hg | Ap | 20 |
| 10 | $C_2H_5$ | H | S | 110–115°/0.2 mm. Hg | B | 18 |
| 11 (Ex. 5) | $CH_3$ | $CH_3$ | S | 118–122°/0.2 mm. Hg | B | 27 |
| 12 | $C_2H_5$ | $C_2H_5$ | S | 110°/0.2 mm. Hg | B | 13 |

[1] NOTE.—"A" means the method using chloroform and tertiary base. "t" means that the tertiary base is triethylamine. "p" means that the tertiary base is pyridine. "p'" means that the pyridine is added dropwise into the reaction mixture. "B" means the method using toluene, finely powdered anhydrous potassium carbonate and copper powder.

*Example 6.—Emulsion preparation*

An emulsion preparation was prepared by mixing the ingredients shown below.

| | Parts |
|---|---|
| A compound of the present invention | 25–50 |
| Xylene or toluene | 20–45 |
| A polyethylene glycol nonylphenyl ether | 30 |

*Example 7.—Wettable powder*

A wettable powder was prepared by mixing homogeneously the ingredients shown below and pulverizing the mixture by an atomizer.

| | Parts |
|---|---|
| A compound described in the present invention | 25 |
| White carbon | 20 |
| Diatomaceous earth | 20 |
| Ammonium dinaphthylmethanedisulfonate | 3 |
| An alkylbenzenesulfonate | 8 |
| Clay | 8 |

*Example 8.—Dust*

Dust was prepared by mixing homogeneously the ingredients shown below.

| | Parts |
|---|---|
| A compound described in the present invention | 1.0–3.0 |
| White carbon | 5 |
| Fatty acid of tall oil | 1 |
| Talc | 50 |
| Clay, remaining parts to make the total 100 parts. | |

*Example 9.—Granule preparation*

A granule preparation was prepared by mixing the ingredients shown below, kneading the resulting mixture with 25 parts of water, molding and drying the resulting product.

| | Parts |
|---|---|
| A compound of the present invention | 2–8 |
| Diatomaceous earth | 15 |
| Bentonite | 30 |
| Fatty acid of tall oil | 2 |
| Sodium ligninsulfonate | 2 |
| Talc | 20 |
| Clay, remaining parts to make the total 100 parts. | |

The following test data are presented to exhibit the effectiveness of the compounds according to the invention.

TEST NO. 1.—INSECTICIDAL EFFECTS TO HOUSE FLIES (*MUSCA DOMESTICA*, NORMAL STRAIN) BY TOPICAL METHOD

| No. | Compound | | | $LD_{50}$ (μg./♀) [1] |
|---|---|---|---|---|
| | R¹ | R² | X | |
| 1 | $CH_3$ | H | O | 0.05 |
| 2 | $C_2H_5$ | H | O | 0.66 |
| 4 | i-$C_3H_7$ | H | O | 3.45 |
| 5 | n-$C_4H_9$ | H | O | <10 (54%) |
| 6 | $C_6H_5$ | H | O | >10 (5%) |
| 7 | $CH_3$ | $CH_3$ | O | 0.3 |
| 8 | $C_2H_5$ | $C_2H_5$ | O | >10 (0%) |
| 9 | $CH_3$ | H | S | 0.05 |
| 11 | $CH_3$ | $CH_3$ | S | 0.4 |
| 12 | $C_2H_5$ | $C_2H_5$ | S | 0.5 |
| Parathion | | | | 0.04 |
| Malathion | | | | 0.6 |
| Salithion | | | | 0.04 |

[1] $LD_{50}$ value was calculated from mortality after 24 hours from the treatment using acetone solution at 25° C. A lot comprises 25 insects. The data are the average test value of 2 lots. Each of the numbers in the parentheses is mortality at the indicated concentration of the compound.

TEST NO. 2.—ORAL TOXICITY TOWARDS MICE

| Compound: | $LD_{50}$ (mg./kg.) |
|---|---|
| No. 1 | 10–25 |
| No. 7 | 50–70 |

TEST NO. 3.—SYSTEMIC ACTIVITY AGAINST GREEN RICE LEAF-HOPPERS ON RICE PLANTS WHOSE ROOTS WERE SOAKED IN AN AQUEOUS EMULSION OF THE COMPOUNDS

[Mortality (percent)[1] after 24 hrs. at 25° C. at indicated concentration (p.p.m.).]

| Compound | Concentration | | |
|---|---|---|---|
| | 1 | 10 | 100 |
| No. 1 | 7.4 | 44.4 | 100 |
| No. 7 | 0 | 14.8 | 81.4 |
| Thimet | 37 | 74.1 | 96.3 |
| Schradan | 0 | 0 | 88.9 |

[1] One lot comprised 10 insects. The data are the average test values of 3 lots.

TEST NO. 4.—NEMATOCIDAL ACTIVITIES TO RHABDITIS

| No. | Compound | | | Approximate LC$_{100}$ (p.p.m.)[1] |
|---|---|---|---|---|
| | R$_1$ | R$_2$ | X | |
| 1 | CH$_3$ | H | O | <10 |
| 2 | C$_2$H$_5$ | H | O | 10–25 |
| 3 | n-C$_3$H$_7$ | H | O | 25–50 |
| 4 | i-C$_3$H$_7$ | H | O | 50–100 |
| 5 | n-C$_4$H$_9$ | H | O | 25–50 |
| 7 | CH$_3$ | CH$_3$ | O | >200(10%) |
| 8 | C$_2$H$_5$ | C$_2$H$_5$ | O | 100–150 |
| 9 | CH$_3$ | H | S | 25–50 |
| 11 | CH$_3$ | CH$_3$ | S | 50–100 |
| 12 | C$_2$H$_5$ | C$_2$H$_5$ | S | >200(30%) |
| | D-D | | | >800(85%) |

[1] The LC$_{100}$ value was calculated from mortality after 24 hours from the treatment at 25° C. Each of the numbers in the parentheses is the mortality at the indicated concentration of the compound.

TEST NO. 5.—ACARICIDAL ACTIVITIES TO *TETRANYCHUS TELARIUS* L. ON FRENCH BEAN [1]

| Compound | Concentration (percent) | Number of tested acarid | Mortality (percent) |
|---|---|---|---|
| No. 1 (emulsion) | 0.04 | 45 | 100 |
| | 0.02 | 43 | 100 |
| | 0.01 | 47 | 100 |
| Nontreatment | | 74 | 0 |

[1] The test was conducted as follows. The first leaf of French bean was cut off by leaf punch having 5.5 cm. diameter and dipped for 10 seconds in the emulsion indicated in the table and dryed in the air. The leaf was infected with about 40–70 of the acarid. Mortality after 3 days from the infection was observed. The test was conducted in a hothouse.

What we claim is:

1. A method for killing insects which comprises contacting the insects with, as the essential insecticidal agent, a toxic amount of a phosphoramidate compound having the general Formula I,

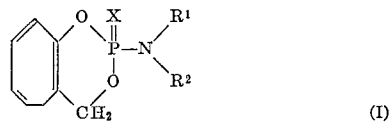

(I)

wherein R$^1$ represents a member selected from the group consisting of hydrogen atom, alkyl and aryl radicals, R$^2$ represents a member selected from the group consisting of hydrogen atom and alkyl radicals and X represents a member selected from the group consisting of oxygen and sulphur atoms.

2. A method for combating nematodes, which comprises applying to soil, as the essential nematocidal agent, a toxic amount of a phosphoramidate compound having the general Formula I,

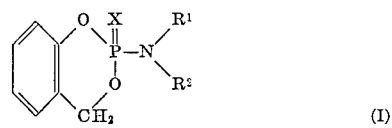

(I)

wherein R$^1$ represents a member selected from the group consisting of hydrogen atom, alkyl and aryl radicals, R$^2$ represents a member selected from the group consisting of hydrogen atom and alkyl radicals and X represents a member selected from the group consisting of oxygen and sulphur atoms.

3. A method for controlling acarides which comprises contacting the acarides with, as the essential ascaridecidal agent, a toxic amount of a phosphoramidate compound having the general Formula I,

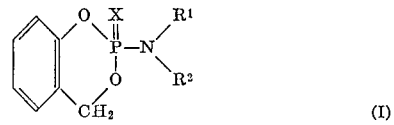

(I)

wherein R$^1$ represents a member selected from the group consisting of hydrogen atom, alkyl and aryl radicals, R$^2$ represents a member selected from the group consisting of hydrogen atom and alkyl radicals and X represents a member selected from the group consisting of oxygen and sulphur atoms.

4. A method for systemically killing insects, which comprises applying to soil around plants which are subject to insect infestation a toxic amount of a phosphoramidate compound having the general Formula I,

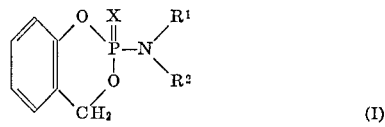

(I)

wherein R$^1$ represents a member selected from the group consisting of hydrogen atom, alkyl and aryl radicals, R$^2$ represents a member selected from the group consisting of hydrogen atom and alkyl radicals and X represents a member selected from the group consisting of oxygen and sulphur atoms in order to obtain systemic insecticidal activity through said plants.

References Cited by the Examiner

UNITED STATES PATENTS 2,875,235   2/1959   Lanham _____ 260—461

OTHER REFERENCES

Casida, J. E., et al., Biochem. Pharmacol., 12:73–83 (1963); abstracted in Chem. Abstracts, 58:9542f (1963).

Casida, J. E., et al., Nature, 191, 1396–7 (1961) abstracted in Chem. Abstracts, 57:2535G (1962).

Chem. Abstracts, 6th Collective Index 1957–1961, page 1568S ("Benzodioxaphosphorin and 4H-1, 3, 2" entries).

Chem. Abstracts, 57, page 327s (1962).

Chem. Abstracts, 58, page 300s (1963).

Chem. Abstracts, 59, page 323s (1963).

Chem. Abstracts, 60, page 356S (Jan.–June 1964).

Eto, M., et al., Biochem. Pharmacol., 11:337–352 (1962); Abstracted in Chem. Abstracts 57:5249ce (1962).

Eto, M., et al., Agr. Biol. Chem. (Tokyo) 26:452–9, 630–4 (1962); abstracted in Chem. Abstracts 59, 3269f (1963).

Eto, M., et al., Nature, 200:171–2 (1963); abstracted in Chem. Abstracts 60:3434C (Feb. 3, 1964).

Eto, M., et al., Agr. Biol. Chem. (Tokyo), 27 (10); 723–7 (1963); abstracted in Chem. Abstracts, 60:6158h–6159a (Mar. 2, 1964).

Eto, M., et al., Agr. Biol. Chem. (Tokyo), 27:789–794 (1963); abstracted in Chem. Abstracts 60:7944C (Mar. 30, 1964).

Eto, M., et al., Agr. Biol. Chem. (Tokyo), 27 (12): 870–5 (1963); abstracted in Chem. Abstracts, 60:T1131h (Apr. 27, 1964).

LEWIS GOTTS, *Primary Examiner.*

SHEP K. ROSE, *Assistant Examiner.*